(12) United States Patent
Silverstein et al.

(10) Patent No.: US 12,190,054 B2
(45) Date of Patent: Jan. 7, 2025

(54) ASSET MANAGEMENT REPORTING SYSTEM

(71) Applicant: International Business Machines Corporation, Armonk, NY (US)

(72) Inventors: Zachary A. Silverstein, Jacksonville, FL (US); Jacob Ryan Jepperson, St. Paul, MN (US)

(73) Assignee: International Business Machines Corporation, Armonk, NY (US)

( * ) Notice: Subject to any disclaimer, the term of this patent is extended or adjusted under 35 U.S.C. 154(b) by 692 days.

(21) Appl. No.: 17/022,472

(22) Filed: Sep. 16, 2020

(65) Prior Publication Data
US 2022/0083731 A1  Mar. 17, 2022

(51) Int. Cl.
| | | |
|---|---|---|
| G06F 40/20 | (2020.01) | |
| G06F 16/35 | (2019.01) | |
| G06N 20/00 | (2019.01) | |
| G06Q 10/08 | (2023.01) | |

(52) U.S. Cl.
CPC .............. *G06F 40/20* (2020.01); *G06F 16/35* (2019.01); *G06N 20/00* (2019.01); *G06Q 10/08* (2013.01)

(58) Field of Classification Search
CPC ... G06F 40/20; G06F 3/04847; G06Q 50/163; G06Q 10/06; G06Q 10/10; G06Q 10/067; G06Q 10/087; G06Q 30/0202; G06Q 30/0621; G06Q 30/0635; G06Q 10/02; G06Q 10/1095; G06Q 10/06313; H04L 47/70; H04L 51/216; H04L 12/2827; H04L 12/282
See application file for complete search history.

(56) References Cited

U.S. PATENT DOCUMENTS

| | | | |
|---|---|---|---|
| 8,291,319 B2 | 10/2012 | Li | |
| 8,396,741 B2 | 3/2013 | Kannan | |
| 8,775,348 B2 | 7/2014 | Lebeau | |
| 9,336,187 B2 | 5/2016 | Kimberly | |
| 10,938,678 B2* | 3/2021 | Ghosh | G06F 40/295 |
| 11,443,305 B2* | 9/2022 | Tourne | G06F 9/466 |
| 11,645,593 B2* | 5/2023 | Jarvis | G06Q 10/06 705/7.23 |
| 12,052,390 B2* | 7/2024 | Negi | G06N 3/006 |
| 2013/0282417 A1* | 10/2013 | Gaedcke | G06Q 30/0241 705/304 |
| 2014/0012856 A1* | 1/2014 | Abdelrahman | G06Q 30/0621 707/740 |
| 2016/0219048 A1* | 7/2016 | Porras | H04L 41/40 |
| 2018/0174165 A1* | 6/2018 | Renz | G06Q 30/0202 |

(Continued)

OTHER PUBLICATIONS

Anonymous et al., "AI for IT: Preventing Outages With Predictive Analytics", Splunk Inc., 2018, 5 Pages.

(Continued)

*Primary Examiner* — Florian M Zeender
*Assistant Examiner* — Milena Racic
(74) *Attorney, Agent, or Firm* — Yee & Associates, P.C.

(57) ABSTRACT

A plurality of baseline information associated with at least one user is retrieved. An issue with at least one office building asset included in the plurality of baseline information is dynamically identified. A down time of the at least one office building asset is reduced by reporting the dynamically identified issues associated with the at least one office building asset.

20 Claims, 5 Drawing Sheets

(56) References Cited

U.S. PATENT DOCUMENTS

| | | | | |
|---|---|---|---|---|
| 2019/0156443 | A1* | 5/2019 | Hall | G06Q 30/0283 |
| 2019/0205774 | A1* | 7/2019 | Ba | G06N 20/20 |
| 2019/0215183 | A1* | 7/2019 | Krasadakis | H04L 12/282 |
| 2019/0349321 | A1* | 11/2019 | Cai | G06N 3/04 |
| 2020/0096346 | A1* | 3/2020 | Dhandapani | G06Q 10/02 |
| 2020/0142365 | A1* | 5/2020 | Sharma | G06N 7/01 |
| 2020/0162354 | A1* | 5/2020 | Drees | G06N 3/047 |
| 2020/0213006 | A1* | 7/2020 | Graham | H04B 10/116 |
| 2021/0117213 | A1* | 4/2021 | Chen | G06F 9/453 |
| 2022/0083731 | A1* | 3/2022 | Silverstein | G06F 40/20 |
| 2024/0347079 | A1* | 10/2024 | Karlin | G11B 27/34 |

OTHER PUBLICATIONS

Campbell, Rebecca, "AI can now 'listen' to machines to tell if they're breaking down", TNW, Artificial Intelligence, The Next Web, Amsterdam, The Netherlands, Jul. 4, 2018, 7 Pages.

Campbell, Rebecca, "An AI that 'hears' machine failure might soon be used for roller coasters", TNW, The Heart of Tech, The Next Web, Amsterdam, The Netherlands, Aug. 2, 2018, 8 Pages.

Guo et al., "Artificial Intelligence-Based Semantic Internet of Things in a User-Centric Smart City", Sensors 2018, 18(5), 1341, doi:10.3390/s18051341, Apr. 26, 2018, 22 Pages.

Preuveneers et al., "Semantic analysis and verification of context-driven adaptive applications in intelligent environments", Journal of Reliable Intelligent Environments, DOI 10.1007/s40860-016-0019-5, Springer International Publishing, Switzerland, Apr. 13, 2016, 21 Pages.

Vassileva et al., "AI-Based Diagnostics for Fault Detection and Isolation in Process Equipment Service", Computing and Informatics, vol. 33, 2014, 23 Pages.

Yoo et al., "Real-time location system-based asset tracking in the healthcare field: lessons learned from a feasibility study", BMC medical informatics and decision making, 2018, 10 Pages, <https://doi.org/10.1186/s12911-018-0656-0>.

\* cited by examiner

ASSET MANAGEMENT REPORTING SYSTEM

BACKGROUND

The present invention relates generally to the field of asset management, and more particularly to dynamically identifying and reporting issues with office building assets.

Asset management is a critical function of every business, from the smallest "Mom and Pop" corner store to the largest conglomerate. Some assets are actively monitored based on their importance to the business, their cost, and the possibility that an asset may be lost or stolen. Laptop computers and smartphones fall into this category. Other assets, for example, network printers and company servers which host personnel records and payroll, are actively monitored for functionality, reliability and security (i.e., preventing intrusion from a hacker). There is also a group of assets that while not actively managed are important to the continued success of the business via the morale of the employees—assets such as the coffee machine, the microwave, the refrigerator, the vending machine, the heating and cooling system, the lighting, and the like.

SUMMARY OF THE INVENTION

Embodiments of the present invention include an approach for dynamically identifying and reporting issues with office building assets. In one embodiment, a plurality of baseline information associated with at least one user is retrieved. An issue with at least one office building asset included in the plurality of baseline information is dynamically identified. A down time of the at least one office building asset is reduced by reporting the dynamically identified issues associated with the at least one office building asset.

DETAILED DESCRIPTION

Figure 1:
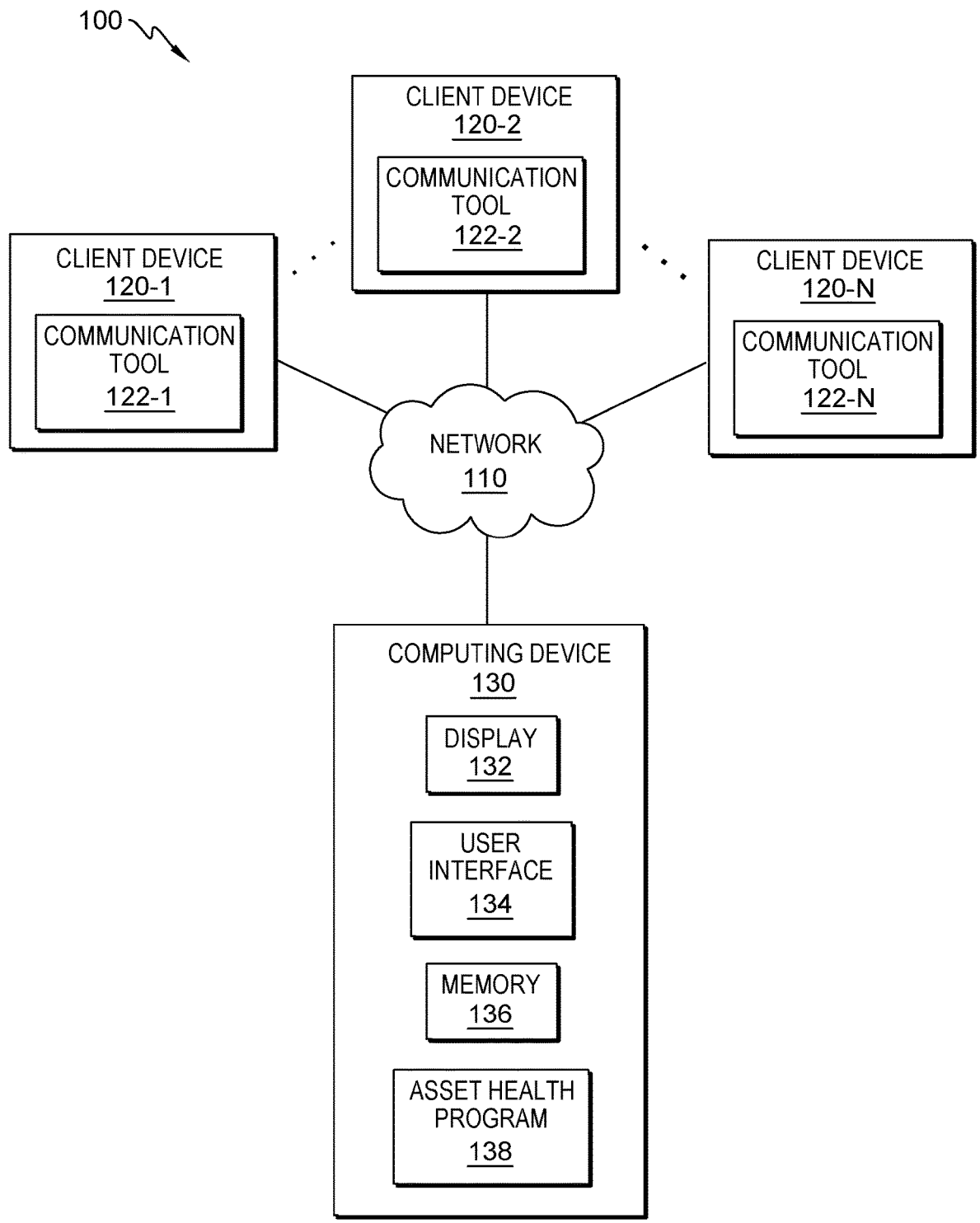
FIG. 1 depicts a functional block diagram illustrating a computing environment which includes an asset health program, in accordance with an embodiment of the present invention.

Embodiments of the present invention recognize that asset management is an important function for all businesses. Some assets are capable of self-reporting (i.e., reporting an internal issue automatically and autonomously. Other assets rely on a person using the asset to report on any issues with the asset to another person responsible for the function of the asset. Often, a person who discovers an issue with an asset may be too busy to report the issue, may not know the proper system for reporting, or may assume that someone else has already reported said issue. The result is a non-working coffee machine or no hot water in the sinks for who knows how long.

Embodiments of the present invention recognize that there may be a method, computer program product, and computer system for dynamically identifying and reporting issues with office building assets. Here, 'office building' refers to any type of building with assets found in office buildings such as vending machines (e.g., coffee, pop, and snack machines), microwave ovens, heating and air conditioning systems, refrigerators, water heaters, task lighting, and the like. The method, computer program product, and computer system improve the field of asset management by providing a dynamic means of automatically identifying an issue with an asset and automatically reporting said issue to a responsible organization for resolution. Here, an 'issue' is a problem with the normal function of an asset (e.g., the water heater does not heat the water, the vending machine does not give change, the coffee machine only fill the cup half-way, the lights in the conference room do not turn on, etc.). A benefit of this automatic identification and reporting is faster identification of an issue leading to reduced down time for an asset based on a faster resolution. This improves employee morale because the coffee machine is available for the office early birds and the afternoon employee with a hunger pang is able to grab a snack from the vending machine. In an embodiment, communications are monitored between users in an office who have opted-in to an asset health management program. Further in the embodiment, an asset is identified. Further yet in the embodiment, responsive to identifying that the asset is local to the user, the full communication of the users is retrieved. Further yet in the embodiment, responsive to determining that the users have opted-in, a determination is made whether an asset issue is included in the retrieved communication. Further yet in the embodiment, responsive to determining that an asset issue is included in the communication, floorplans are retrieved for the users. Further yet in the embodiment, the locations of the users are retrieved. Further yet in the embodiment, an asset is determined. Further yet in the embodiment, a service request is transmitted associated with the determined asset.

References in the specification to "one embodiment", "an embodiment", "an example embodiment", etc., indicate that the embodiment described may include a particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present invention will now be described in detail with reference to the Figures.

FIG. 1 is a functional block diagram illustrating a computing environment, generally designated 100, in accordance with one embodiment of the present invention. FIG. 1 provides only an illustration of one implementation of the present invention and does not imply any limitations with regard to the systems and environments in which different embodiments may be implemented. Many modifications to the depicted embodiment may be made by those skilled in the art without departing from the scope of the invention as recited by the claims.

In an embodiment, computing environment 100 includes client device 120-1, client device 120-2, client device 120-N, and computing device 130, interconnected by network 110. In example embodiments, computing environment 100 includes other computing devices (not shown in FIG. 1) such as smartwatches and other wearable technology, cell phones, smartphones, phablets, tablet computers, additional laptop computers, additional desktop computers, other computer servers, or any other computer system known in the art, interconnected with client device 120-1, client device 120-2, client device 120-N, and computing device 130 over network 110. For readability, client device 120-N will be used in this document to refer to any of client device 120-1, client device 120-2, client device 120-N, and any other instance of client device 120.

In embodiments of the present invention, client device 120-N and computing device 130 are connected to network 110, which enables client device 120-N and computing device 130 to access other computing devices and/or data not directly stored on client device 120-N and computing device 130. Network 110 may be, for example, a short-range, low power wireless connection, a local area network (LAN), a telecommunications network, a wide area network (WAN) such as the Internet, or any combination of the four, and include wired, wireless, or fiber optic connections. Network 110 includes one or more wired and/or wireless networks which are capable of receiving and transmitting data, voice, and/or video signals, including multimedia signals which include voice, data, and video information. In general, network 110 is any combination of connections and protocols which will support communications between client device 120-N, computing device 130, and any other computing devices (not shown in FIG. 1) connected to network 110, in accordance with embodiments of the present invention.

According to an embodiment of the present invention, client device 120-N may be one of a laptop, tablet, or netbook personal computer (PC), a desktop computer, a personal digital assistant (PDA), a smartphone, a standard cell phone, a smartwatch or any other wearable technology, or any other hand-held, programmable electronic device capable of communicating with any other computing device within computing environment 100. According to embodiments, client device 120-N can be a standalone computing device, a management server, a web server, a mobile computing device, or any other electronic device or computing system capable of receiving, transmitting, and processing data. In other embodiments, client device 120-N can represent computing systems utilizing multiple computers as a server system, such as in a cloud computing environment. In certain embodiments, client device 120-N represents a computer system utilizing clustered computers and components (e.g., database server computers, application server computers, etc.) which act as a single pool of seamless resources when accessed by elements of computing environment 100. In general, client device 120-N is representative of any electronic device or combination of electronic devices capable of executing computer readable program instructions. In an embodiment, computing environment 100 includes any number of client device 120-N. Client device 120-N may include internal and external hardware components as depicted and described in further detail with respect to FIG. 4, in accordance with embodiments of the present invention. According to an embodiment of the present invention, client device 120-N includes communication tool 122-N (i.e., communication tool 122-1, communication tool 122-2, and any other instance of communication tool 122-N).

In an embodiment, communication tool 122-N is a program or application which allows two or more users of client device 120-N to communicate with one another over network 110. Examples of communication tool 122-N include, but are not limited to, an e-mail program, an audio and/or video chat application, a voice application (i.e., a Voice over Internet Protocol, or VoIP application), a standard telephone line, a cellular phone, a collaboration application, a texting application, and any other means of communication known in the art which allows two or more users to communicate over network 110.

According to an embodiment of the present invention, computing device 130 may be one of a laptop, tablet, or netbook personal computer (PC), a desktop computer, a personal digital assistant (PDA), a smartphone, a standard cell phone, a smartwatch or any other wearable technology, or any other hand-held, programmable electronic device capable of communicating with any other computing device within computing environment 100. According to embodiments, computing device 130 can be a standalone computing device, a management server, a web server, a mobile computing device, or any other electronic device or computing system capable of receiving, transmitting, and processing data. In other embodiments, computing device 130 can represent computing systems utilizing multiple computers as a server system, such as in a cloud computing environment. In certain embodiments, computing device 130 represents a computer system utilizing clustered computers and components (e.g., database server computers, application server computers, etc.) which act as a single pool of seamless resources when accessed by elements of computing environment 100. In general, computing device 130 is representative of any electronic device or combination of electronic devices capable of executing computer readable program instructions. In an embodiment, computing environment 100 includes any number of computing device 130. Computing device 130 may include internal and external hardware components as depicted and described in further detail with respect to FIG. 4, in accordance with embodiments of the present invention. In an embodiment, computing device 130 is substantially similar to client device 120-N. According to an embodiment of the present invention, computing device 130 includes display 132, user interface 134, memory 136, and asset health program 138.

According to an embodiment, display 132 is an electronic visual device for a desktop computer, laptop computer, tablet computer, smartphone, smart-watch, and the like. Display 132 may include a touchscreen which is an input device layered on top of the display for allowing a user to control an electronic device via simple or multi-touch gestures by touching display 132 with a special stylus and/or one or more fingers. Display 132 displays open programs and applications, such as an email program, allowing a user of computing device 130 to interact with the open programs and applications via a keyboard, mouse, and buttons (not shown in FIG. 1). Display 132 may be a thin film transistor liquid crystal display (TFT-LCD), a flat panel LED (light emitting diode) display, a cathode ray tube (CRT), or any type of display device known in the art or developed in the future. Display 132 may be connected to computing device 130 via VGA (video graphics array), DVI (digital video interface), HDMI (High Definition Multi-Media Interface), or any other connection type known in the art or developed in the future. According to an embodiment, display 132 visually presents information such as the health status of an asset to a user of computing device 130.

In an embodiment, user interface 134 provides an interface between a user of computing device 130 and asset health program 138. User interface 134 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. User interface 134 may also be mobile application software which provides an interface between computing device 130 and asset health program 138. Mobile application software, or an "app," is a computer program designed to run on smartphones, tablet computers and other mobile devices. User interface 134 enables a user of computing device 130 to interact with client device 120-N, asset health program 138, any other programs and applications included on computing device 130 (not shown in FIG. 1), and any other computing devices (not shown in FIG. 1).

According to an embodiment, memory 136 is storage which is written to and/or read by asset health program 138, and any other programs and applications on computing device 130. In one embodiment, memory 136 resides on computing device 130. In other embodiments, memory 136 resides on client device 120-N or on any other device (not shown in FIG. 1) in computing environment 100, in cloud storage, or on another computing device accessible via network 110. In yet another embodiment, memory 136 represents multiple storage devices within computing device 130. Memory 136 may be implemented using any volatile or non-volatile storage media for storing information, as known in the art. For example, memory 136 may be implemented with a tape library, optical library, one or more independent hard disk drives, multiple hard disk drives in a redundant array of independent disks (RAID), solid-state drives (SSD), or random-access memory (RAM). Similarly, memory 136 may be implemented with any suitable storage architecture known in the art, such as a relational database, an object-oriented database, or one or more tables. In an embodiment of the present invention, asset health program 138, and any other programs and applications (not shown in FIG. 1) operating on computing device 130 may store, read, modify, or write data to memory 136. In an embodiment of the present invention, data stored to memory 136 includes, but is not limited to, data stored by asset health program 138 such as a listing of office building assets and floorplans of the office building.

In an embodiment of the present invention, asset health program 138 is a program, a subprogram of a larger program, an application, a plurality of applications, or mobile application software, which functions to dynamically identify and report issues with office building assets. A program is a sequence of instructions written to perform a specific task. In an embodiment, asset health program 138 runs independently. In other embodiments, asset health program 138 depends on system software and/or other programs (not shown in FIG. 1) to execute. According to an embodiment, asset health program 138 is a cognitive system based on artificial intelligence utilizing machine learning and deep learning which (i) monitors communication between two or more users, (ii) determines if an issue with an office building asset is identified, (iii) determines a location of the asset, and (iv) transmits a service request associated with the asset. In one embodiment, asset health program 138 functions as a stand-alone program residing on computing device 130. In another embodiment, asset health program 138 works in conjunction with other programs, applications, etc., found in computing environment 100. In yet another embodiment, asset health program 138 resides on other computing devices such as client device 120-N in computing environment 100, which are interconnected to computing device 130 via network 110.

According to an embodiment, asset health program 138 receives two or more user opt-ins. In the embodiment, asset health program 138 integrates with communication tools of the opted-in users. Further in the embodiment, asset health program 138 retrieves a set of keywords and associated keyword ontologies. Further yet in the embodiment, asset health program 138 monitors communication of the two or more opted-in user. Further yet in the embodiment, asset health program 138 identifies an asset reference. Further yet in the embodiment, asset health program 138 determines whether the referenced asset is a local asset. Further yet in the embodiment, responsive to determining that the referenced asset is local, asset health program 138 retrieves the communication. Further yet in the embodiment, asset health program 138 analyzes the retrieved communication. Further yet in the embodiment, asset health program 138 determines whether an issue with an asset is included in the retrieved communication. Further yet in the embodiment, responsive to determining that an issue with an asset is included in the retrieved communication, asset health program 138 retrieves the floorplan(s) of the users associated with the retrieved communication. Further yet in the embodiment, asset health program 138 determines the locations of the users and the possible assets which could be included in the retrieved communication. Further yet in the embodiment, asset health program 138 determines the specific asset referenced in the retrieved communication. Further yet in the embodiment, asset health program 138 transmits a service request associated with the determined asset.

Figure 2A:
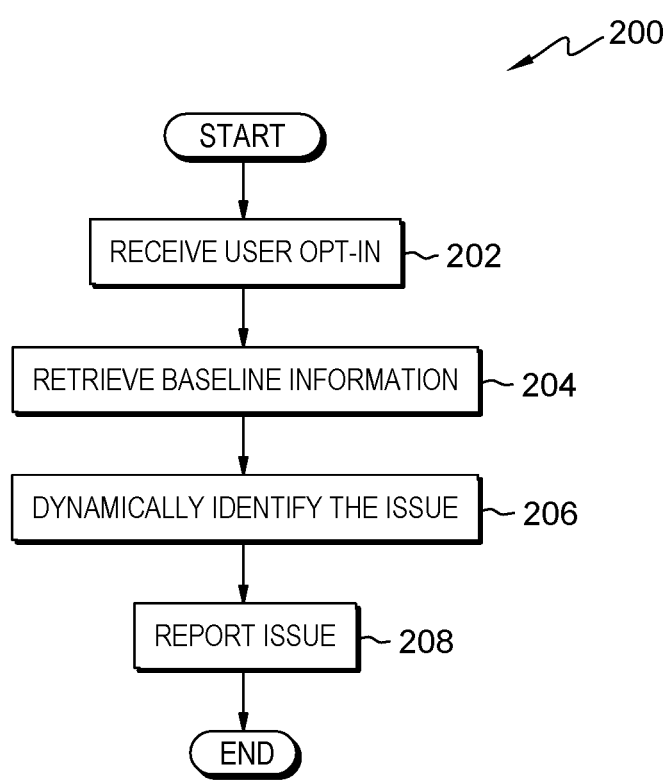
FIG. 2A is a flowchart depicting a high level overview of the operational steps of an asset health program, on a computing device within the computing environment of FIG. 1, in accordance with an embodiment of the present invention.

FIG. 2A is a flowchart of workflow 200 depicting a high level overview of a method for dynamically identifying and reporting issues with office building assets. In one embodiment, the method of workflow 200 is performed by asset health program 138. In an alternative embodiment, the method of workflow 200 is performed by any other program in computing environment 100 working with asset health program 138. In an embodiment, a user of client device 120-N invokes workflow 200 upon initiating a form of communication with another user. In an alternative embodiment, a user of computing device 130 invokes workflow 200 upon powering on computing device 130.

According to an embodiment of the present invention, asset health program 138 receives user opt-in (step 202). In other words, asset health program 138 receives an acknowledgement from two or more users to participate (i.e., opt-in) in using asset health program 138, as discussed in greater detail with respect to step 252 of FIG. 2B.

In an embodiment, asset health program 138 retrieves baseline information (step 204). In other words, asset health program 138 integrates with one or more communication tools and retrieves keywords, as discussed in greater detail with respect to steps 254 and 256 of FIG. 2B.

According to an embodiment, asset health program 138 dynamically identifies issue (step 206). In other words, asset health program 138 monitors communications, identifies an asset reference, determines whether the asset is local, responsive to determining the asset is local, retrieves additional communications, analyzes all of the communication, and determines whether an issue is identified, as discussed in greater detail with respect to steps 258-268 of FIG. 2B.

In an embodiment, asset health program 138 reports issue (step 208). In other words, asset health program 138 retrieves floorplans, determines locations, determines asset, and transmits a service request, as discussed in greater detail with respect to steps 270-276 of FIG. 2B.

Figure 2B:
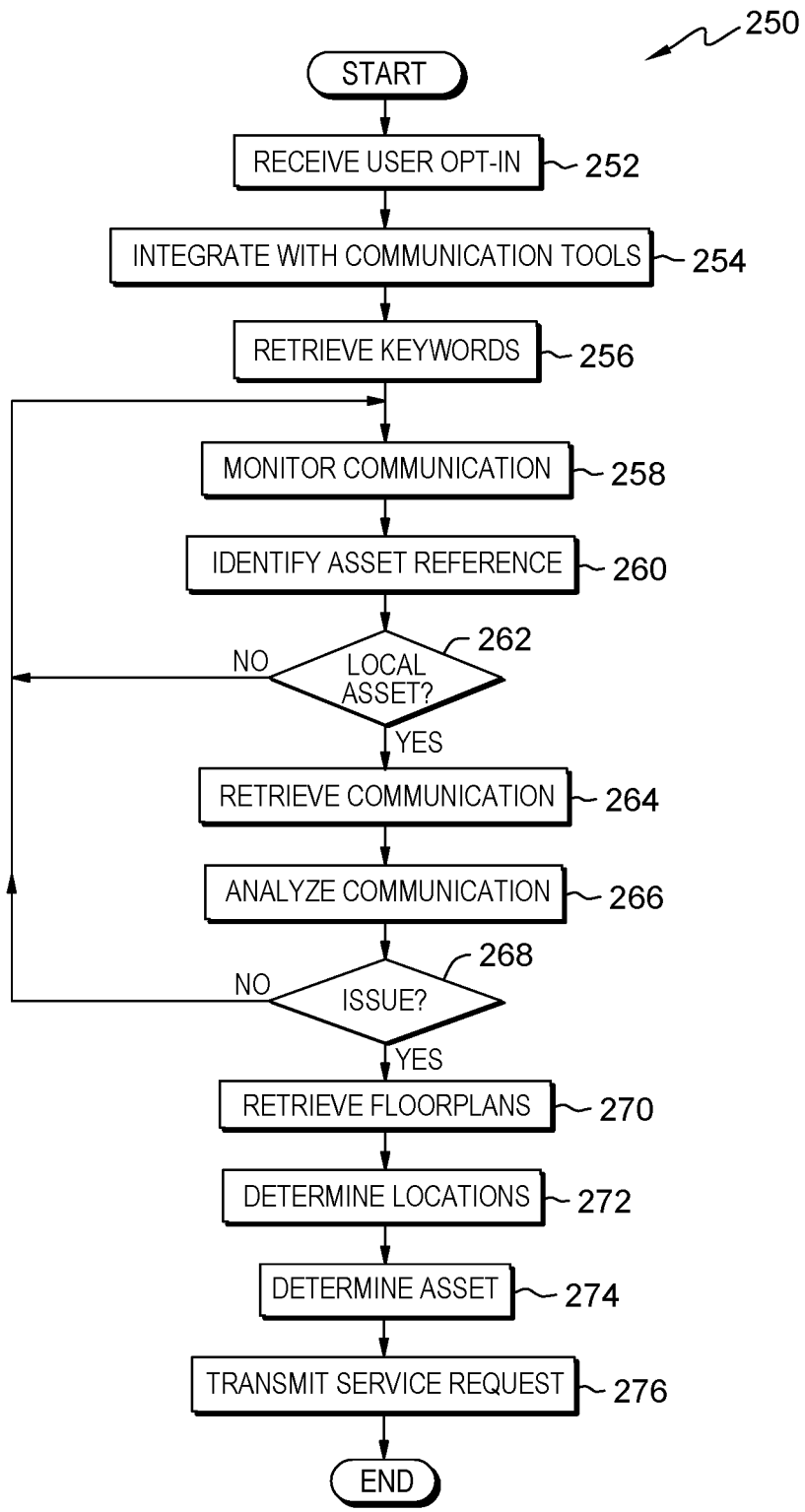
FIG. 2B is a flowchart depicting detailed operational steps of an asset health program for dynamically identifying and reporting issues with office building assets, on a computing device within the computing environment of FIG. 1, in accordance with an embodiment of the present invention.

FIG. 2B is a flowchart of workflow 250 depicting a method for dynamically identifying and reporting issues with office building assets. In one embodiment, the method of workflow 250 is performed by asset health program 138. In an alternative embodiment, the method of workflow 250 is performed by any other program in computing environment 100 working with asset health program 138. In an embodiment, a user of client device 120-N invokes workflow 250 upon initiating a form of communication with another user. In an alternative embodiment, a user of computing device 130 invokes workflow 250 upon powering on computing device 130.

According to an embodiment of the present invention, asset health program 138 receives user opt-in (step 252). In other words, asset health program 138 receives an acknowledgement from two or more users to participate (i.e., opt-in) in using asset health program 138. In an embodiment, asset health program 138 may utilize various accessible data sources which may include personal data, content, or information the two or more users wish not to be processed. Personal data includes personally identifying information or sensitive personal information as well as user information, such as tracking or geolocation information. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal data. Opting-in to use asset health program 138 enables the authorized and secure processing of personal and non-personal data. Asset health program 138 provides informed consent, with notice of the collection of personal and non-personal data, allowing the two or more users to opt-in or opt-out of the processing personal and non-personal data. Consent can take several forms. Opt-in consent can impose on a user to take an affirmative action before the personal or non-personal data is processed. Alternatively, opt-out consent can impose on the user to take an affirmative action to prevent the processing of personal or non-personal data before data is processed. Asset health program 138 provides information regarding personal data and the nature (e.g., type, scope, purpose, duration, etc.) of the processing. Asset health program 138 provides the two or more users with copies of stored personal data. Further, asset health program 138 allows for the correction or completion of incorrect or incomplete personal data and also allows for the immediate deletion of personal data. According to an embodiment, asset health program 138 on computing device 130 receives an opt-in over network 110 from two or more users of client device 120-N. For example, a program on a company server receives user opt-in acknowledgement from 'Ann', 'Max', and 'Tim', employees of the company.

In an embodiment, asset health program 138 integrates with communication tools (step 254). In other words, responsive to receiving the user opt-ins, asset health program 138 integrates with one or more communication tools utilized by the opted-in users. According to an embodiment, 'integrate with' means to coordinate with to become a functioning whole (e.g., program 'A' integrates with program 'B' and the result is a working program which includes the functions of both program 'A' and program 'B'). According to the embodiment, communication tools include, but are not limited to, an e-mail program, an audio and/or video chat application, a voice application (i.e., a Voice over Internet Protocol, or VoIP application), a standard telephone line, a cellular phone, a collaboration application, a texting application, and any other means of communication known in the art which allows two or more users to communicate over a network. In an embodiment, asset health program 138 integrates with communication tool 122-N on client device 120-N. For example, the program on the company server integrates with the chat tool used by 'Ann', 'Max', and 'Tim' while they are at work for the company.

According to an embodiment of the present invention, asset health program 138 retrieves keywords (step 256). In other words, asset health program 138 retrieves a set of keywords and associated ontology trees associated with office building assets. In one embodiment, asset health program 138 retrieves the keywords and ontologies from an accessible memory. In another embodiment, asset health program 138 retrieves the keywords and associated keyword ontologies from an asset database within an asset management tool (not shown in FIG. 1). The associated ontology trees show how the retrieved keywords may be grouped, related within a hierarchy, and subdivided according to similarities and differences, and enable asset health program 138 to determine when an asset is mentioned in a communication. According to an embodiment, asset health program 138 retrieves a set of keywords and associated keyword ontologies from memory 136 on computing device 130. For example, the program on the company server retrieves a set of keywords and associated keyword ontologies from an asset management database located on the server.

In an embodiment, asset health program 138 monitors communication (step 258). In other words, asset health program 138 monitors the communications between the two or more users who have opted-in to participating in the usage of asset health program 138. According to an embodiment, the monitored communications are electronic (i.e., written by the two or more users). According to another embodiment, the communications are verbal (i.e., spoken to the two or more users). According to the embodiment, methods of communication include, but are not limited to, e-mail, audio and/or video chat, phone calls, team room, texts, and any other methods of communication known in the art. In an embodiment, asset health program 138 monitors the communication between the two or more opted-in users utilizing communication tool 122-N on client device 120-N. For example, the program on the company server monitors the chat between 'Ann', 'Max', and 'Tim'; the three employees are discussing a new project assigned to them by their manager.

According to an embodiment of the present invention, asset health program 138 identifies asset reference (step 260). In other words, responsive to monitoring communication between the two or more opted-in users, asset health program 138 identifies a reference made by at least one of the two or more opted-in users to an office building asset. In an embodiment, asset health program 138 compares, in real-time, the content of the on-going communication to the retrieved set of keywords and the associated keyword ontologies and when a match is found, asset health program 138 determines that an asset has been referenced in the communication. According to an embodiment, asset health program 138 identifies an asset reference in the on-going communication between the users of client device 120-N who are utilizing communication tool 122-N. For example, the program on company server identifies the office building asset 'fridge', and via the ontology, identifies refrigerator in the following, on-going chat between 'Ann', 'Max', and 'Tim': 'Max'—this new project is going to be complicated. 'Ann'—agreed, I think we will all be putting in some overtime hours. 'Max'—no doubt. 'Tim'—great, I can use the extra money, especially since the breakroom fridge seems to be on the fritz; my four frozen lunches I put in there on Monday all thawed so I had to throw them out. 'Ann' and 'Max', in virtual unison, that stinks!

In an embodiment, asset health program 138 determines whether the asset is local (decision step 262). In other words, responsive to identifying the asset reference, asset health program 138 determines whether the referenced asset is a local office building asset. A local asset is an office building asset generally available to the two or more users whose communication is being monitored (e.g., a coffee machine in the same office building, a cafeteria on the company campus, etc.). A non-local asset is an office building asset that is not generally available to the users (e.g., for users located in company site 'A' in a first state, vending machines in company site 13' in a second state). According to an embodiment, asset health program 138 analyzes the context of the on-going communication to determine whether the asset is local. In one embodiment (decision step 262, NO embodiment), asset health program 138 determines that the referenced asset is not local; therefore, asset health program 138 returns to step 258 to continue monitoring communications between opted-in users. In the embodiment (decision step 262, YES branch), asset health program 138 determines that the references asset is local; therefore, asset health program 138 proceeds to step 264.

According to an embodiment of the present invention, asset health program 138 retrieves communication (step 264). In other words, asset health program 138 retrieves additional (i.e., previous) communication of the two or more opted-in users and continues to monitor the on-going communication. In an embodiment, asset health program 138 retrieves the prior communication from at least one of a cache (i.e., temporary) memory or a permanent memory. In the embodiment, asset health program 138 may also retrieve stored communications from other opted-in users, based on the content of said communications. According to an embodiment, asset health program 138 retrieves the prior communication between the two or more users of client device 120-N who are utilizing communication tool 122-N from memory 136 on computing device 130. For example, the program on the company server retrieves the prior portion of the chat between 'Ann', 'Max', and 'Tim' which is stored to an available cache memory. Said portion includes the following exchange: 'Ann'—hey 'Tim', just ran into 'Max' in the hallway and we decided we should talk about our new assignment, are you available to chat with us right now? 'Tim'—sure thing, bring 'Max' into the chat.

In an embodiment, asset health program 138 analyzes communication (step 266). In other words, responsive to retrieving the prior communication between the two or more opted-in users, asset health program 138 analyzes the retrieved communication. According to an embodiment, asset health program 138 uses various techniques known in the art such as natural language processing (NLP) including natural language classification (NLC) and natural language understanding (NLU), sentiment analysis, text mining, and the like to analyze the retrieved prior communication to determine a context of said communication related to the identified asset reference and derive whether the context is indicative of a failure or issue of the asset. In an embodiment, asset health program 138 analyzes the retrieved prior communication and the on-going communication via any number of techniques known in the art. For example, the program on the company server analyzes the retrieved prior communication between 'Ann', 'Max', and 'Tim' as well as the on-going communication between the three employees. The analysis shows that the only reference to the asset is the comment made by 'Tim' concerning the thawing of the four frozen lunches, all of which had to be thrown away.

According to an embodiment of the present invention, asset health program 138 determines whether an issue is identified (decision step 268). In other words, responsive to analyzing the retrieved prior communication and the on-going communication, asset health program 138 determines whether an issue is identified which is related to an office building asset. According to the embodiment, asset health program 138 utilizes the results of the analysis to make the determination. In one embodiment (decision step 268, NO branch), asset health program 138 determines that there is not an issue related to an office building asset; therefore, asset health program 138 returns to step 258 to continue monitoring communications. In the embodiment (decision step 268, YES branch), asset health program 138 determines that there is an issue related to an office building asset; therefore, asset health program 138 proceeds to step 270.

In an embodiment, asset health program 138 retrieves floorplans (step 270). In other words, responsive to determining that there is an issue related to an office building asset, asset health program 138 retrieves one or more floorplans of the office building associated with the asset and the two or more users in the monitored communication. According to an embodiment, asset health program 138 retrieves the one or more floorplans from an accessible memory. According to another embodiment, asset health program 138 retrieves the one or more floorplans from a floorplan management tool. In an embodiment of the present invention, asset health program 138 retrieves one or more floorplans associated with the office building asset with the determined issue and the two or more users of client device 120-N from memory 136 on computing device 130. For example, the program on the company server retrieves the floorplans associated with 'Ann', 'Max', 'Tim', and the refrigerator from an asset database included on the server.

According to an embodiment of the present invention, asset health program 138 determines locations (step 272). In other words, responsive to retrieving the one or more floorplans, asset health program 138 determines the locations of the two or more users participating in the on-going communication and the locations of potential office building assets with the issue. In an embodiment, asset health program 138 uses available resources (e.g., the names of the participants, a company directory, an evacuation plan, the content of the communication, etc.) to determine the locations (i.e., offices) of the two or more users. Based on the determination of the locations of the two or more users, asset health program 138 determines the location of the potential office building assets with the issue by cross-referencing the locations of the two or more users with the locations of potential assets as derived from any number of resources such as a floorplan management tool, an asset management tool, the content of the on-going communication, and the like. In the embodiment, if asset health program 138 is unable to identify the potential locations of the asset with the issue, asset health program 138 may transmit a query to one or more of the two or more users participating in the on-going conversation requesting clarification of the location of the asset. Asset health program 138 utilizes NLP techniques to determine the location of the asset based on the response from the one or more users. According to an embodiment, asset health program 138 determines the locations of the two or more users of client device 120-N as well as potential locations of office building assets with the issue. For example, the program on the company server determines that 'Ann', 'Max' and 'Tim' all reside on the first floor of the company office building. Further, since 'Tim' referred to 'the breakroom fridge', the program is able to locate the asset with the issue. Had 'Tim' not made the 'breakroom' reference, the program would have identified the 'fridges' (i.e., refrigerators) on the first floor of the company office building. If there were none, the program would have identified the nearest 'fridge' to 'Tim' as 'Tim' is the complainant in this example.

In an embodiment, asset health program 138 determines asset (step 274). In other words, based on determining the locations of the two or more users participating in the on-going communication and the cross-referenced locations of potential office building assets, asset health program 138 determines the asset with the issue. According to an embodiment, when only one potential asset is determined based on the determined locations, asset health program 138 determines that the potential asset is the office building asset with the issue. According to another embodiment, when more than one potential asset is determined based on the determined locations, asset health program 138 determines the asset with the issue based on at least one of the following: the asset nearest to the complainant, the function of the assets, the asset with the worst maintenance history (i.e., most problem reports), the age of the assets, the content of the on-going communication, the content of additional retrieved communication from other opted-in users, and any other relevant information that can be used to determine the asset. In an embodiment, asset health program 138 determines the asset with the issue identified in on-going communication between the users of client device 120-N utilizing communication tool 122-N. For example, the program on the company server determines that the refrigerator/freezer in the breakroom is the asset with the issue. Further, the program determines that the specific issue is with the freezer portion of the refrigerator/freezer given the reference made by 'Tim' about the lunches thawing while in the freezer.

According to an embodiment, asset health program 138 transmits service request (step 276). In other words, responsive to determining the asset with the issue based on the determined locations, asset health program 138 transmits a service request associated with the determined asset. In an embodiment, the service request is transmitted to at least one of an asset management tool, an asset management company, a maintenance person responsible for the asset, and an owner of the asset. In the embodiment, the transmitted service request includes at least the name and location of the asset, the current time and date, and the information relevant to the asset issue. In an embodiment, asset health program 138 includes navigation information to the determined asset in the transmitted service request such as a map generated from the retrieved floorplan and global positioning coordinates. According to an embodiment, asset health program 138 transmits a service request via network 110 to a user of client device 120-N, the owner of the office building asset with the issue. For example, the program on the company server transmits a service request to the company asset management tool indicating that the freezer located in the first floor breakroom is not working properly.

In additional embodiments, asset health program 138 updates machine learning (ML) models associated with the various office building assets to improve the maintenance plans and failure predictions for the assets. The models are updated with the information determined by asset health program 138 as it monitors and analyzes communication, locates assets, and transmits service requests. Further, asset health program 138 correlates user communication with asset usage to predict a time of failure (i.e., the time the issue began) and a possible cause of the issue.

Figure 3A:
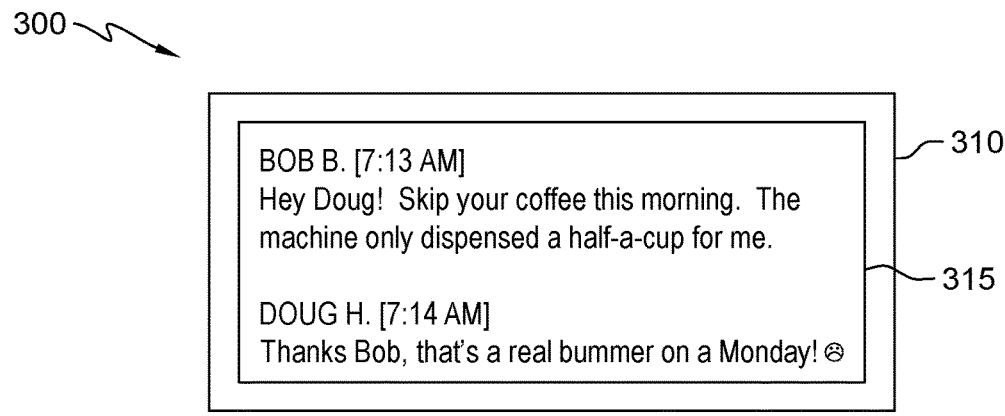
FIG. 3A depicts an example conversation captured by an asset health program, in accordance with an embodiment of the present invention.

FIG. 3A depicts communication 300, a portion of a chat between two users who have both opted-in to asset health program 138. Communication 300 includes display 310 and chat 315. By analyzing chat 315 of communication 300, asset health program 138 is able to determine that users 'Bob B.' and 'Doug H.' are participating in a chat and further identify an issue with a coffee machine as referenced by 'Bob B.'.

Figure 3B:
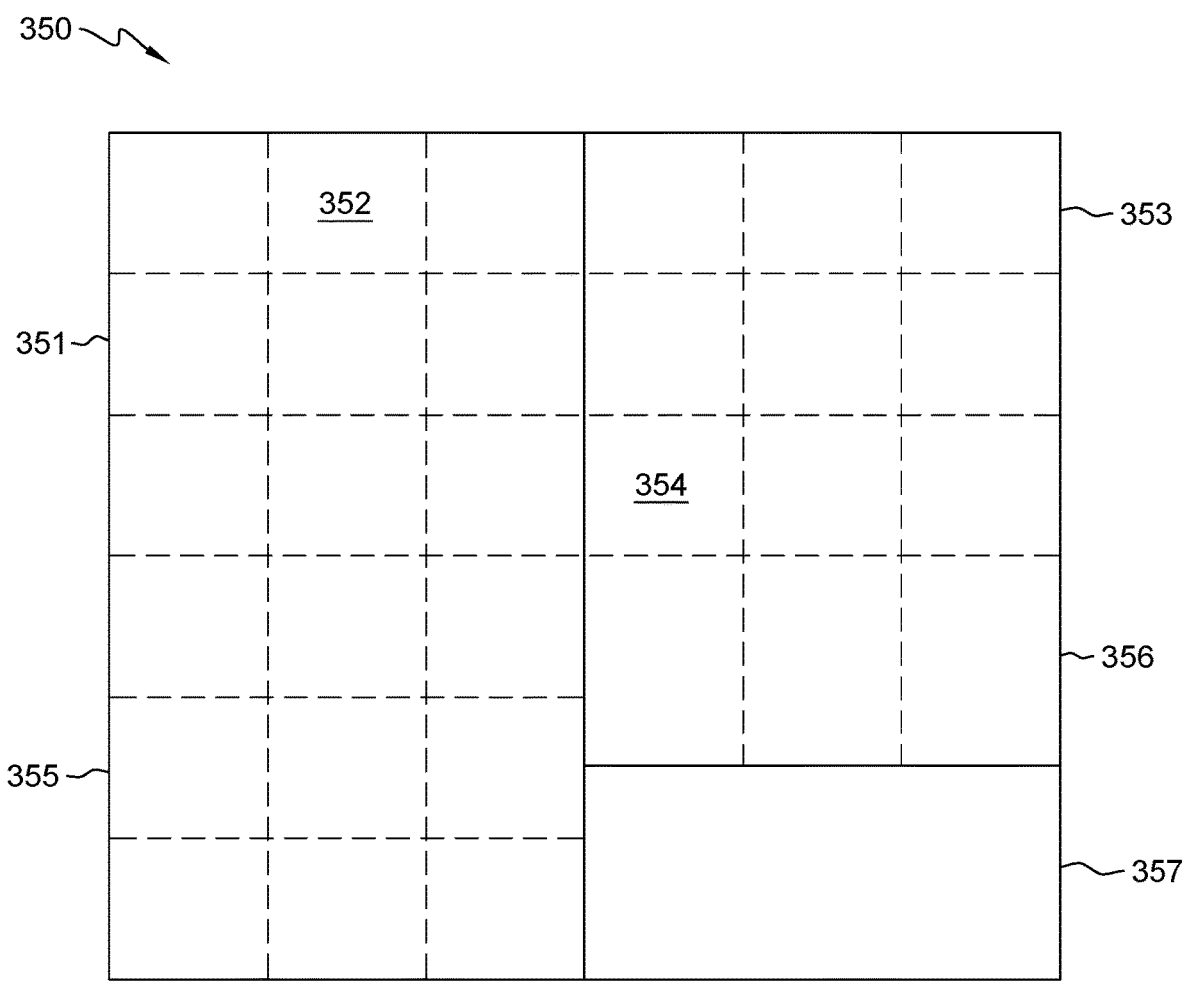
FIG. 3B depicts an example floorplan of a block diagram of an office building, in accordance with an embodiment of the present invention.

FIG. 3B depicts floorplan 350, a block diagram of the second floor of an office building where users 'Bob B.' and 'Doug H.' have their offices. Based on the above analysis of chat 315 and the determination of an issue with a coffee machine, asset health program 138 retrieves floorplan 350, which includes office quad 351, office 352, office quad 353, office 354, office quad 355, restrooms 356, and breakroom 357. Asset health program 138 determines, based on a personnel directory that 'Bob B.' occupies office 352 in office quad 351 and 'Doug H.' occupies office 354 in office quad 353. Based on the determined location of the two chat participants, asset health program 138 identifies the potential location of the coffee machine as breakroom 357 as there are no other coffee machines located on the second floor of the office building per floorplan 350 and its associated asset management plan. Accordingly, asset health program 138 transmits a service request to the identified owner of the coffee machine (per the asset management plan) indicating that the coffee machine is out-of-order.

Figure 4:
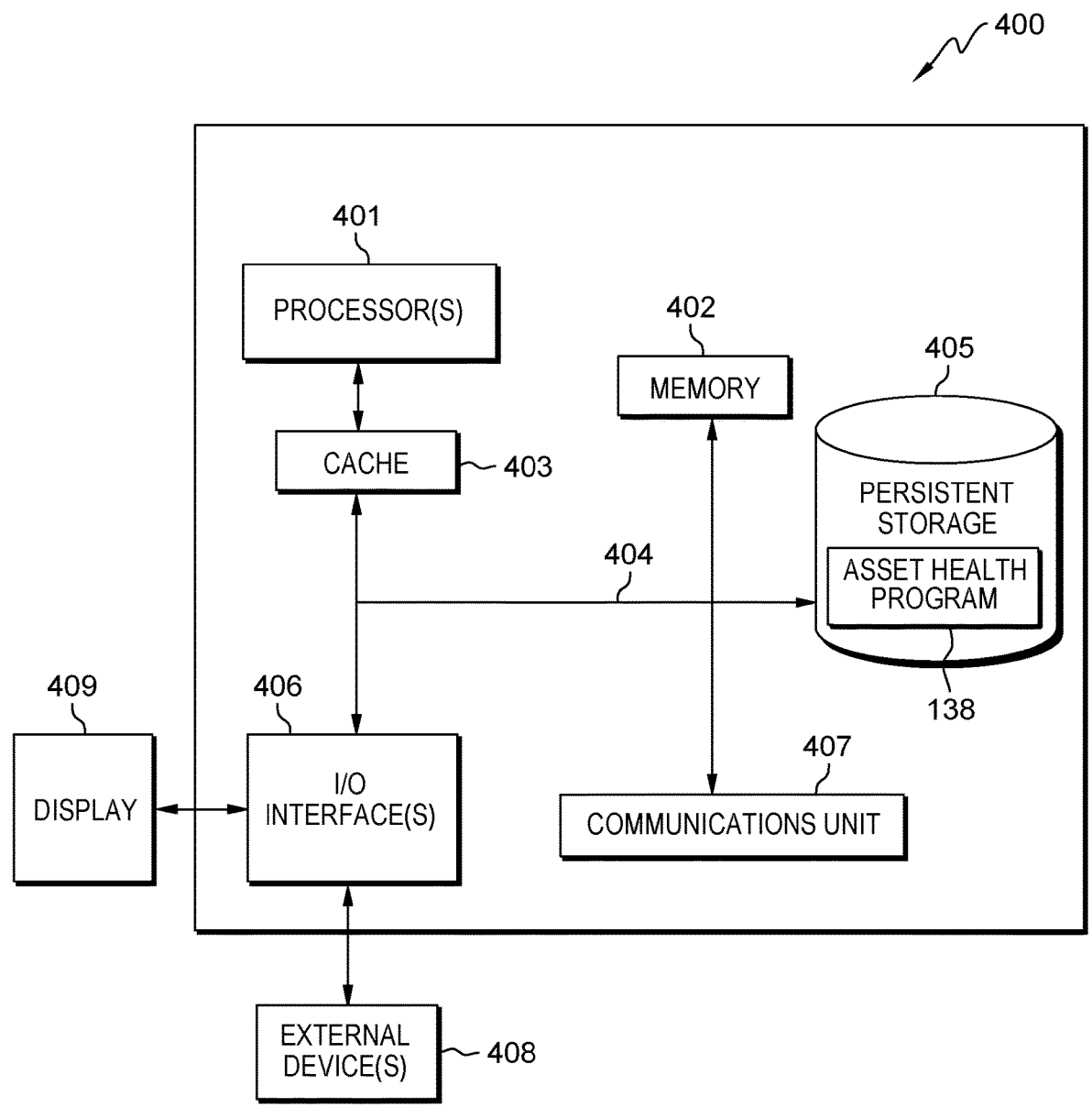
FIG. 4 depicts a block diagram of components of a computing device executing an asset health program within the computing environment of FIG. 1, in accordance with an embodiment of the present invention.

FIG. 4 depicts computer system 400, which is an example of a system which includes asset health program 138. Computer system 400 includes processors 401, cache 403, memory 402, persistent storage 405, communications unit 407, input/output (I/O) interface(s) 406 and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processors 401 by holding recently accessed data, and data near recently accessed data, from memory 402.

Program instructions and data used to practice embodiments of the present invention may be stored in persistent storage 405 and in memory 402 for execution by one or more of the respective processors 401 via cache 403. In an embodiment, persistent storage 405 includes a magnetic hard disk drive. Alternatively, or in addition to a magnetic hard disk drive, persistent storage 405 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data used to practice embodiments of the present invention may be downloaded to persistent storage 405 through communications unit 407.

I/O interface(s) 406 allows for input and output of data with other devices that may be connected to each computer system. For example, I/O interface 406 may provide a connection to external devices 408 such as a keyboard, keypad, a touch screen, and/or some other suitable input device. External devices 408 can also include portable computer readable storage media such as, for example, thumb drives, portable optical or magnetic disks, and memory cards. Software and data used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A method, the method comprising:
   monitoring, by one or more computer processors, a communication between two or more users, wherein the two or more users have opted-in to processing of a set of personal and non- personal data by an asset health program;
   identifying, by one or more computer processors, a reference to at least one office building asset made by at least one user of the two or more users in the monitored communication, wherein the at least one office building asset is reliant on a first user to report any issue with the at least one office building asset to at least one of an asset management tool, an asset management company, a maintenance person responsible for the at least one office building asset, and an owner of the at least one office building asset;
   retrieving, by one or more computer processors, a plurality of baseline information associated with the at least one user of the two or more users;
   determining, by one or more computer processors, the at least one office building asset is a local asset available to the at least one user of the two or more users;
   dynamically identifying, by one or more computer processors, an issue with the at least one office building asset included in the plurality of baseline information;
   determining, by one or more computer processors, location of the at least one office building asset associated with the identified issue by cross-referencing locations of the two or more users with location of office building assets based on a floorplan;
   predicting, by one or more computer processors using one or more machine learning models, a time of failure and a cause for the identified issue by correlating user communication with usage for the at least one office building asset; and
   transmitting, by one or more computer processors, a service request associated with the at least one office building asset with the dynamically identified issues to the at least one of the asset management tool, the asset management company, the maintenance person responsible for the at least one office building asset, and the owner of the at least one office building asset in order to reduce a down time of the at least one office building asset.

2. The method of claim 1, wherein the step of retrieving comprises:
   integrating, by one or more computer processors, with a set of communication tools utilized by the at least one user of the two or more users; and
   retrieving, by one or more computer processors, a set of keywords and associated ontology trees associated with a group office building assets associated with at least one office building of the at least one user of the two or more users.

3. The method of claim 1, wherein the step of dynamically identifying comprises:
   retrieving, by one or more computer processors, additional communication of the at least one user of the two or more users which is associated with the at least one office building asset;
   analyzing, by one or more computer processors, the monitored communication, the retrieved additional communication, and on-going communication of the at least one user of the two or more users; and
   determining, by one or more computer processors, an issue associated with the at least one office building asset based on one or more results of analyzing the monitored communication, the retrieved communication, and on-going communication of the at least one user of the two or more users.

4. The method of claim 1, wherein the step of transmitting comprises:
   retrieving, by one or more computer processors, one or more floorplans of the at least one office building of the at least one user of the two or more users;
   determining, by one or more computer processors, a location of the at least one user of the two or more users and a plurality of possible asset locations associated with the identified reference to the at least one office building asset; and
   determining, by one or more computer processors, the at least one office building asset associated with the dynamically identified issue based on a cross-referencing of the location of the at least one user of the two or more users and the plurality of possible asset locations associated with the identified reference to the at least one office building asset.

5. The method of claim 1, further comprising:
   updating, by one or more computer processors, the one or more machine learning models associated with the at least one office building asset, wherein the one or more machine learning models are used to improve at least one of a maintenance plan and a failure prediction associated with the at least one office building asset.

6. The method of claim 3, wherein the monitored communication, the retrieved communication, and the on-going communication of the at least one user is analyzed by natural language processing, including natural language classification and natural language understanding, sentiment analysis, and text mining.

7. The method of claim 1, wherein the dynamically identified issue is a problem with a normal function of the at least one office building asset.

8. A computer program product, the computer program product comprising:
one or more computer readable storage media; and
program instructions stored on the one or more computer readable storage media, the program instructions comprising:
program instructions to monitor a communication between two or more users, wherein the two or more users have opted-in to processing of a set of personal and non-personal data by an asset health program;
program instructions to identify a reference to at least one office building asset made by at least one user of the two or more users in the monitored communication, wherein the at least one office building asset is reliant on a first user to report any issue with the at least one office building asset to at least one of an asset management tool, an asset management company, a maintenance person responsible for the at least one office building asset, and an owner of the at least one office building asset;
program instructions to retrieve a plurality of baseline information associated with the at least one user of the two or more users;
program instructions to determine the at least one office building asset is a local asset available to the at least one user of the two or more users;
program instructions to dynamically identify an issue with the at least one office building asset included in the plurality of baseline information;
program instructions to determine location of the at least one office building asset associated with the identified issue by cross-referencing locations of the two or more users with location of office building assets based on a floorplan;
program instructions to predict a time of failure and a cause for the identified issue using one or more machine learning models by correlating user communication with usage for the at least one office building asset; and
program instructions to transmit a service request associated with the at least one office building asset with the dynamically identified issues to the at least one of the asset management tool, the asset management company, the maintenance person responsible for the at least one office building asset, and the owner of the at least one office building asset in order to reduce a down time of the at least one office building asset.

9. The computer program product of claim 8, wherein the program instructions to retrieve comprise:
program instructions to integrate with a set of communication tools utilized by the at least one user of the two or more users; and
program instructions to retrieve a set of keywords and associated ontology trees associated with a group office building assets associated with at least one office building of the at least one user of the two or more users.

10. The computer program product of claim 8, wherein the program instructions to dynamically identify comprise:
program instructions to retrieve additional communication of the at least one user of the two or more users which is associated with the at least one office building asset;
program instructions to analyze the monitored communication, the retrieved additional communication, and on-going communication of the at least one user of the two or more users; and
program instructions to determine an issue associated with the at least one office building asset based on one or more results of analyzing the monitored communication, the retrieved communication, and on-going communication of the at least one user of the two or more users.

11. The computer program product of claim 8, wherein the program instructions to transmit comprise:
program instructions to retrieve one or more floorplans of the at least one office building of the at least one user of the two or more users;
program instructions to determine a location of the at least one user of the two or more users and a plurality of possible asset locations associated with the identified reference to the at least one office building asset; and
program instructions to determine the at least one office building asset associated with the dynamically identified issue based on a cross-referencing of the location of the at least one user of the two or more users and the plurality of possible asset locations associated with the identified reference to the at least one office building asset.

12. The computer program product of claim 8, further comprising program instructions stored on the one or more computer readable storage media, to:
update the one or more machine learning models associated with the at least one office building asset, wherein the one or more machine learning models are used to improve at least one of a maintenance plan and a failure prediction associated with the at least one office building asset.

13. The computer program product of claim 10, wherein the monitored communication, the retrieved communication, and the on-going communication of the at least one user is analyzed by natural language processing, including natural language classification and natural language understanding, sentiment analysis, and text mining.

14. The computer program product of claim 10, wherein the dynamically identified issue is a problem with a normal function of the at least one office building asset.

15. A computer system, the computer system comprising:
one or more computer processors;
one or more computer readable storage media; and
program instructions stored on the one or more computer readable storage media for execution by at least one of the one or more computer processors, the program instructions comprising:
program instructions to monitor a communication between two or more users, wherein the two or more users have opted-in to processing of a set of personal and non- personal data by an asset health program;
program instructions to identify a reference to at least one office building asset made by at least one user of the two or more users in the monitored communication, wherein the at least one office building asset is reliant on a first user to report any issue with the at least one office building asset to at least one of an asset management tool, an asset management company, a maintenance person responsible for the at least one office building asset, and an owner of the at least one office building asset;

program instructions to retrieve a plurality of baseline information associated with the at least one user of the two or more users;

program instructions to determine the at least one office building asset is a local asset available to the at least one user of the two or more users;

program instructions to dynamically identify an issue with the at least one office building asset included in the plurality of baseline information;

program instructions to determine location of the at least one office building asset associated with the identified issue by cross-referencing locations of the two or more users with location of office building assets based on a floorplan;

program instructions to predict a time of failure and a cause for the identified issue using one or more machine learning models by correlating user communication with usage for the at least one office building asset; and program instructions to transmit a service request associated with the at least one office building asset with the dynamically identified issues to the at least one of the asset management tool, the asset management company, the maintenance person responsible for the at least one office building asset, and the owner of the at least one office building asset in order to reduce a down time of the at least one office building asset.

16. The computer system of claim 15, wherein the program instructions to retrieve comprise:

program instructions to integrate with a set of communication tools utilized by the at least one user of the two or more users; and program instructions to retrieve a set of keywords and associated ontology trees associated with a group office building assets associated with at least one office building of the at least one user of the two or more users.

17. The computer system of claim 15, wherein the program instructions to dynamically identify comprise:

program instructions to retrieve additional communication of the at least one user of the two or more users which is associated with the at least one office building asset;

program instructions to analyze the monitored communication, the retrieved additional communication, and on-going communication of the at least one user of the two or more users; and program instructions to determine an issue associated with the at least one office building asset based on one or more results of analyzing the monitored communication, the retrieved communication, and on-going communication of the at least one user of the two or more users.

18. The computer system of claim 15, wherein the program instructions to transmit comprise:

program instructions to retrieve one or more floorplans of the at least one office building of the at least one user of the two or more users;

program instructions to determine a location of the at least one user of the two or more users and a plurality of possible asset locations associated with the identified reference to the at least one office building asset; and program instructions to determine the at least one office building asset associated with the dynamically identified issue based on a cross-referencing of the location of the at least one user of the two or more users and the plurality of possible asset locations associated with the identified reference to the at least one office building asset.

19. The computer system of claim 15, further comprising program instructions stored on the one or more computer readable storage media for execution by at least one of the one or more computer processors, to:

update the one or more machine learning models associated with the at least one office building asset, wherein the one or more machine learning models are used to improve at least one of a maintenance plan and a failure prediction associated with the at least one office building asset.

20. The computer system of claim 17, wherein the monitored communication, the retrieved communication, and the on-going communication of the at least one user is analyzed by natural language processing, including natural language classification and natural language understanding, sentiment analysis, and text mining.

* * * * *